United States Patent [19]

Otsuka

[11] Patent Number: 5,090,266
[45] Date of Patent: Feb. 25, 1992

[54] BALL CIRCULATION PATH IN ROTATION TRANSMITTER USING BALLS

[75] Inventor: Naotoshi Otsuka, 49-7 Fujimidai, Mishima-shi, Shizuoka-ken, Japan

[73] Assignees: Yoshio Horiya, Numazu; Naotoshi Otsuka, Mishima; Nihon Seiki Co., Ltd., Numazu, all of Japan

[21] Appl. No.: 605,276

[22] Filed: Oct. 30, 1990

[30] Foreign Application Priority Data

Nov. 2, 1989 [JP] Japan .................. 1-128917[U]
Nov. 2, 1989 [JP] Japan .................. 1-128918[U]

[51] Int. Cl.$^5$ .................. F16H 1/16; F16H 55/22
[52] U.S. Cl. .................. 74/425; 74/458
[58] Field of Search .................. 74/216.3, 425, 458

[56] References Cited

U.S. PATENT DOCUMENTS

| | | | |
|---|---|---|---|
| 3,494,215 | 2/1970 | Fengler | 74/425 |
| 4,951,519 | 8/1990 | Ohtsuka | 74/425 |

FOREIGN PATENT DOCUMENTS

| | | | |
|---|---|---|---|
| 1941380 | 12/1971 | Fed. Rep. of Germany | 74/425 |
| 2528173 | 1/1976 | Fed. Rep. of Germany | 74/425 |
| 59-117952 | 7/1984 | Japan | 74/216.3 |
| 60-14633 | 1/1985 | Japan | 74/216.3 |
| 1116495 | 6/1968 | United Kingdom | 74/425 |

Primary Examiner—Allan D. Herrmann
Attorney, Agent, or Firm—Oblon, Spivak, McClelland, Maier & Neustadt

[57] ABSTRACT

A rotation transmitter using balls comprises a worm gear having a ball circulation path, a large number of metal balls inserted into the ball circulation path in a continuous row, a worm wheel having a large number of ball recesses for accommodating balls on the periphery thereof and meshed with the worm gear via the metal balls, collars provided at the opposite ends of the worm gear, and ball guides of semicircular sectional configuration provided to project tangentially from the collars and cover the ball ports of the worm gear. The ball circulation path is constituted of a helical ball race formed on the outer surface of the worm gear, ball ports formed at the ends of the ball race and a ball circulation passage provided to extend diagonally through the interior of the worm gear at a position offset toward the surface of the worm gear from the axis thereof so as to cause the openings at the opposite ends of the ball circulation passage to connect with the ball ports at an obtuse angle. The ball guides and the ball circulation path cooperate to enable smooth and stable circulation of the metal balls during rotation transmission, thus improving the rotation transmission efficiency.

2 Claims, 5 Drawing Sheets

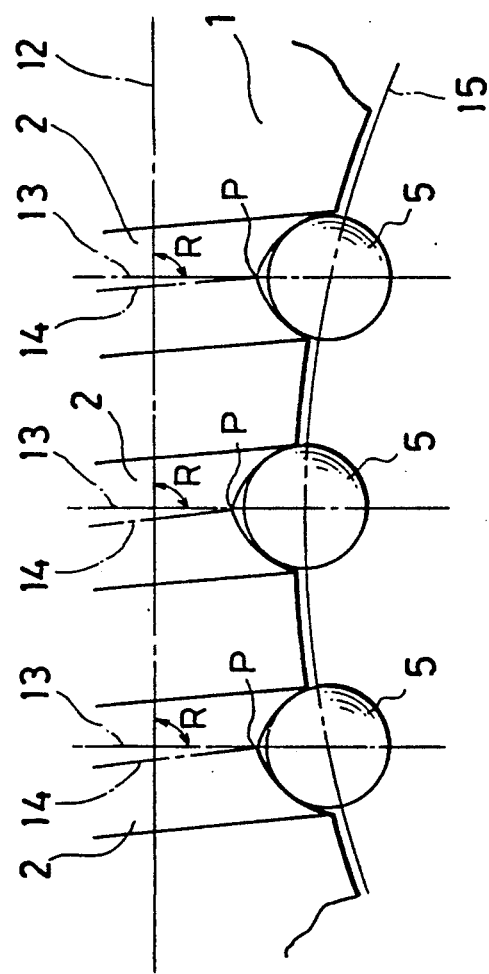

BALL CIRCULATION PATH IN ROTATION TRANSMITTER USING BALLS

BACKGROUND OF THE INVENTION

1. Field of the Invention

This invention relates to a rotation transmitter using balls, and more particularly to a rotation transmitter using balls comprising a worm gear and a worm wheel meshed with the worm gear via a large number of metal balls, wherein the worm gear is provided with a ball circulation path constituted by a helical race formed on, and a circulation passage formed to pass through, the interior of, the worm gear.

2. Prior Art Statement

Various rotation transmitters constituted of a worm gear and worm wheel meshed with the worm gear via a large number of metal balls have been proposed. Some specific examples can be found, for instance, in U.S. Pat. Nos. 3,468,179 and 4,951,519, GB Patent No. 2,164,719, French Patent No. 1,261,122 and Japanese Patent Publications Nos. 38(1963)-22759 and 48(73)-31172.

A typical example of the prior art in this field is shown in FIGS. 12, 13 and 14, which correspond to the disclosure of Japanese Patent Publication No. 38(1963)-22759. As shown, the disclosed rotation transmitter comprises a wheel gear 8, an hourglass-shaped worm gear 1 meshed with the wheel gear 8 via metal balls 5 and covered by an outer guide 7, and a pair of collars 4 provided at opposite ends of the worm gear 1. The ball circulation path of the hourglass-shaped worm gear 1 comprises a ball race 2 on the exterior surface of the worm gear 1 and a ball circulation passage 3 passing along the axis of worm gear 1. As shown in FIG. 14, a ball loading hole 19 is formed in each collar 4 at the junction between the ball race 2 and the ball circulation passage 3 and, after the metal balls have been inserted, the ball loading hole 19 is stopped with a plug 20.

As shown in FIG. 13, each collar 4 is formed with a fan-shaped projection 21 having a guide passage 22. The guide passage 22 is formed by curving the corresponding end of the axial ball circulation passage 3 outwardly and then gradually bending it in the tangential direction until it merges with the ball race 2 on the outer surface of the hourglass-shaped worm gear 1.

The ball circulation path is therefore constituted by the combination of the ball race 2 on the outer surface of the worm gear 1, the guide passage 22 formed in the end faces of the worm gear 1 and the collars 4, and the ball circulation passage 3 passing along the axis of the worm gear 1.

On the other hand, Japanese Patent Publication No. 48(1973)-31172 discloses a rotation transmitter using balls in which the ball circulation path is constituted by using curved guide tubes to connect a ball circulation passage formed inside an hourglass-shaped worm gear along axis thereof with a helical ball race formed on the outer surface of the hourglass-shaped worm gear.

Moreover, while the ball race 2 on the outer surface of the hourglass-shaped worm gear is formed as a gothic groove in order to prevent skew, as shown in FIG. 12, the conventional practice has been to define the position of straight lines extending radially outward from the center 16 of the circle defined by the profile line 15 in the axial direction of the worm gear 1 as radial reference lines 17 and to form the helical ball race 2 by machining from this direction.

Therefore, as shown in FIG. 15, the centermost radial reference line 17 and the axis 12 of the worm gear 1 meet to form left and right angles R which are substantially equal (i.e. right angles). However, with increasing distance from the center and with decreasing diameter of the circle defined by the profile line 15 of the worm gear 1, the angle 8 that the radial reference lines 17 form with the axis 12 becomes increasingly acute and the radial reference lines 17 shift toward the ends of the worm gear 1. As a result, the positions of the radial reference lines 17 become the apexes P of the gothic groove, and the ball race 2, whose standard machining position is the reference line 18 passing through the apexes P, comes to differ increasingly in sectional configuration from that at the center region with increasing proximity to the ends of the worm gear 1 and thus assumes a sectional configuration differing from that of a true gothic groove.

In a conventional rotation transmitter using balls such as that exemplified by Japanese Patent Publication No. 38(1963)-22759, it is extremely difficult to precision-machine, fabricate and adjust the ball circulation path so that the moving balls do not become clogged therein. Moreover, the guide passage formed in the fan-shaped projections of the collars for communicating the ball circulation path along the axis of the hourglass-shaped worm gear with the ball race on the outer surface thereof curve over the short distance to the axis and the end portions thereof connect with the ball circulation path by passing perpendicularly with respect to the ends of the worm gear. As a result, it cannot be expected that the balls will be able to flow smoothly, even if the diameter of the collars is made large.

The ball circulation path disclosed in Japanese Patent Publication No 48(1973)-31172 in which the ball circulation passage and the ball race are connected by guide tubes is an improvement on the ball circulation path disclosed in Japanese Patent Publication No. 38(1963)-22759 and it does in fact reduce the number of components and make fabrication simpler. Nonetheless it still involves a number of problems. Specifically, in providing guide tubes capable of enabling smooth passage of the balls, it is extremely difficult to impart curvature to the guide tubes and to precision-machine the connecting portions thereof in such a way as to maintain the inside diameter thereof within a close tolerance throughout the length thereof, minimize friction and reduce noise.

Moreover, the ball race formed on the outer surface of the conventional hourglass-shaped worm gear is formed as a helical gothic groove by machining in the direction of reference lines that are straight radial lines extending toward the outer surface of the worm gear from the center of the circle defined by the profile line in the axial direction of the worm gear. Since the sectional shape of the ball race therefore differs between the center and end regions of the hourglass-shaped worm gear, the skew preventing effect of the gothic groove is reduced and the contact between the groove and the balls becomes uneven at some positions, leading to an increase in rolling friction and noise. In particular, since the machining has been conducted by rotating the cutting tool in the radial direction, it has been difficult to realize high-precision machining.

OBJECT AND SUMMARY OF THE INVENTION

The object of this invention is to provide a rotation transmitter using balls which enables the balls to travel and roll stably and smoothly so as to increase the efficiency of rotation transmission.

For achieving this object, the present invention provides a rotation transmitter using balls comprising a worm gear having a ball circulation path constituted of a helical ball race formed on the outer surface of the worm gear, ball ports formed at the ends of the ball race and a ball circulation passage provided to extend diagonally through the interior of the worm gear at a position offset toward the surface of the worm gear from the axis thereof so as to cause openings at the opposite ends of the ball circulation passage to connect with the ball ports at an obtuse angle; a large number of metal balls inserted into the ball circulation path in a continuous row; a worm wheel having a large number of ball recesses for accommodating balls on the periphery thereof and meshed with the worm gear via the metal balls; collars provided at the opposite ends of the worm gear; and ball guides of semicircular sectional configuration provided to project tangentially from the collars and cover the ball ports of the worm gear.

Thus in the rotation transmitter using balls according to this invention the ball circulation passage within the worm gear is offset toward the surface of the worm gear from the worm gear axis and extends diagonally. As a result, the ball ports of the ball race and the ball circulation passage connect at an obtuse angle, thus preventing bending and chipping, so that a ball approaching a ball port will smoothly enter/exit the ball port through the cooperative effect of the ball guide structure and the tangential angle. As a result, the balls are able to flow smoothly from the ball race into the ball circulation passage and out of the ball circulation passage into the ball race.

The above and other features of the present invention will become apparent from the following description made with reference to the drawings.

DESCRIPTION OF THE DRAWINGS

FIG. 11 is an enlarged partial view of the ball race of the hourglass-shaped worm gear according to the present invention;

DETAILED DESCRIPTION OF THE PREFERRED EMBODIMENT

Figure 1:
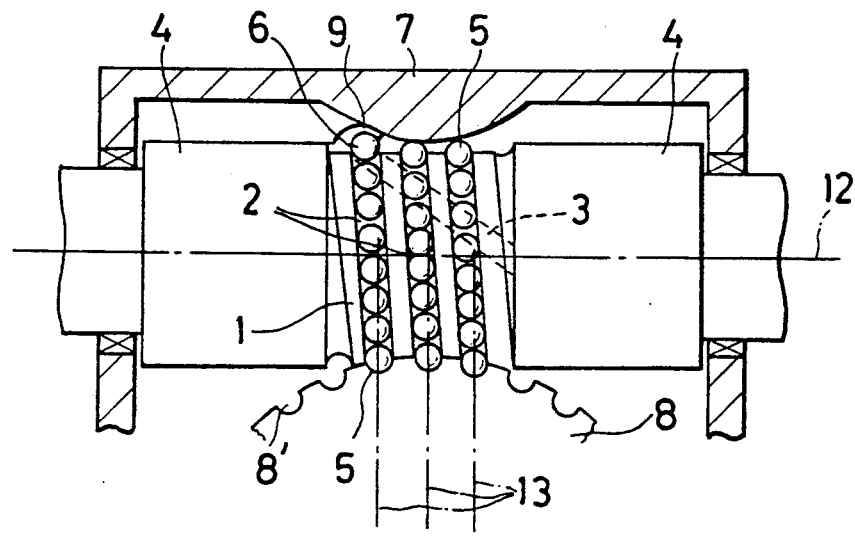
FIG. 1 is a front view, partially in section, of an embodiment of the rotation transmitter using balls in accordance with this invention.
Figure 2:
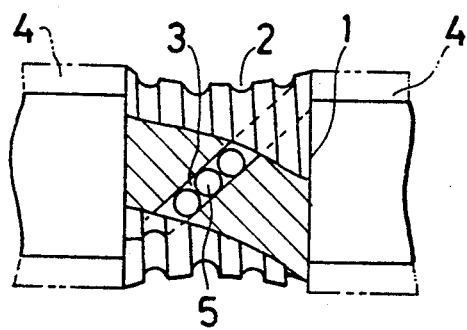
FIG. 2 is a front view, partially in section, of the hourglass-shaped worm gear of the rotation transmitter using balls shown in FIG. 1.
Figure 3:
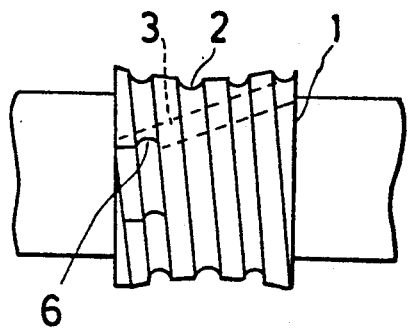
FIG. 3 is a plan view of the worm gear of FIG. 2.
Figure 4:
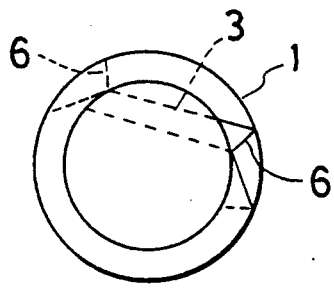
FIG. 4 is a side view of the worm gear of FIG. 2.
Figure 8:
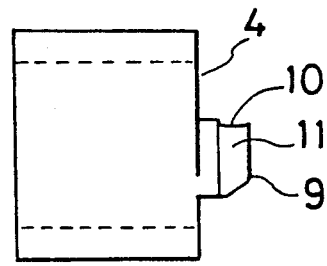
FIG. 8 is a bottom view of the collar of FIG. 5.
Figure 5:
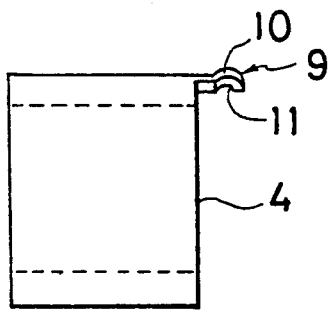
FIG. 5 is a front view of a collar of the rotation transmitter using balls according to this invention.

In the embodiment of the rotation transmitter using balls according to this invention shown in FIG. 1, reference numeral 1 designates an hourglass-shaped worm gear which, as shown more clearly in FIGS. 2 to 4, has a helical ball race 2 machined in its outer surface and a ball circulation passage 3 drilled diagonally through its interior at a position offset away from its axis toward its surface.

As can be seen in FIGS. 3 and 4, portions of the ball race 2 at opposite ends thereof are removed to form ball ports 6 for allowing balls to enter/exit the ball circulation passage 3. The ball circulation passage 3 and the ball ports 6 meet an obtuse angle.

A collar 4 having a ball guide 9 projecting from the side surface thereof is fixed to either end of the hourglass-shaped worm gear 1 with the ball guide 9 covering the corresponding ball port 6 of the ball race 2.

Figure 9:
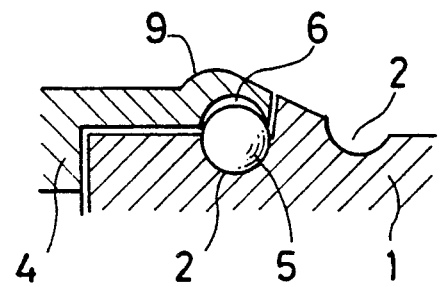
FIG. 9 is a sectional view showing the state in which a ball passes through the region of the ball port of the worm gear and the ball guide.
Figure 6:
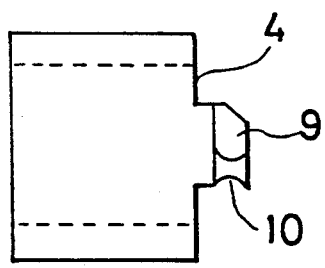
FIG. 6 is a plan view of the collar of FIG. 5.
Figure 10:
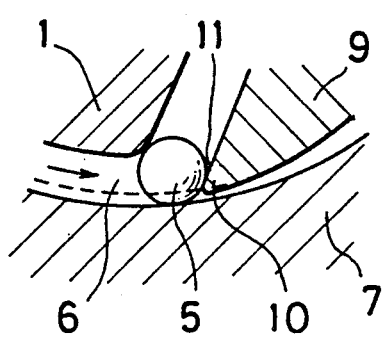
FIG. 10 is a sectional view showing the state of abutment between a ball and the edge portion of the ball guide.
Figure 7:
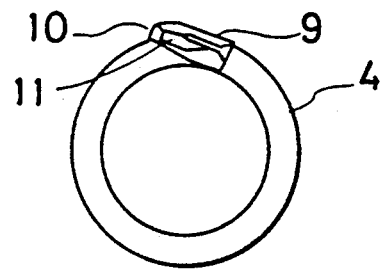
FIG. 7 is a side view of the collar of FIG. 5.
Figure 12:
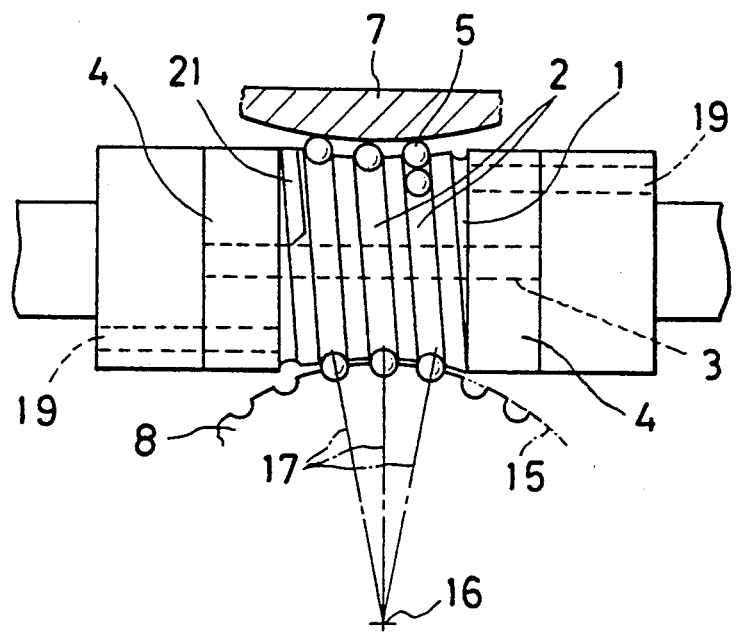
FIG. 12 is a front view of a prior art rotation transmitter using balls.
Figure 13:
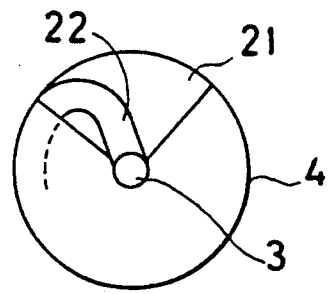
FIG. 13 is a side view of a collar attached to the opposite ends of the hourglass-shaped rotation transmitter using balls of FIG. 12.
Figure 14:
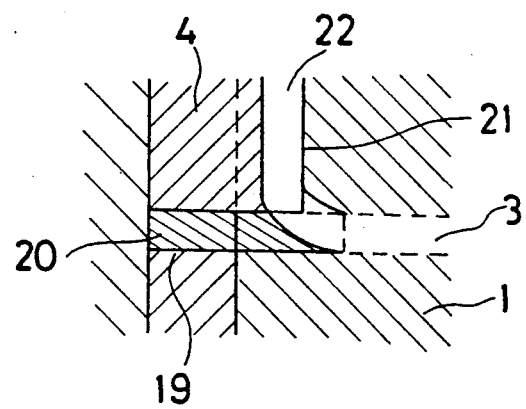
FIG. 14 is an enlarged view of the connecting portion between the collar and the hourglass-shaped worm gear in the rotation transmitter using balls of FIG. 12.
Figure 15:
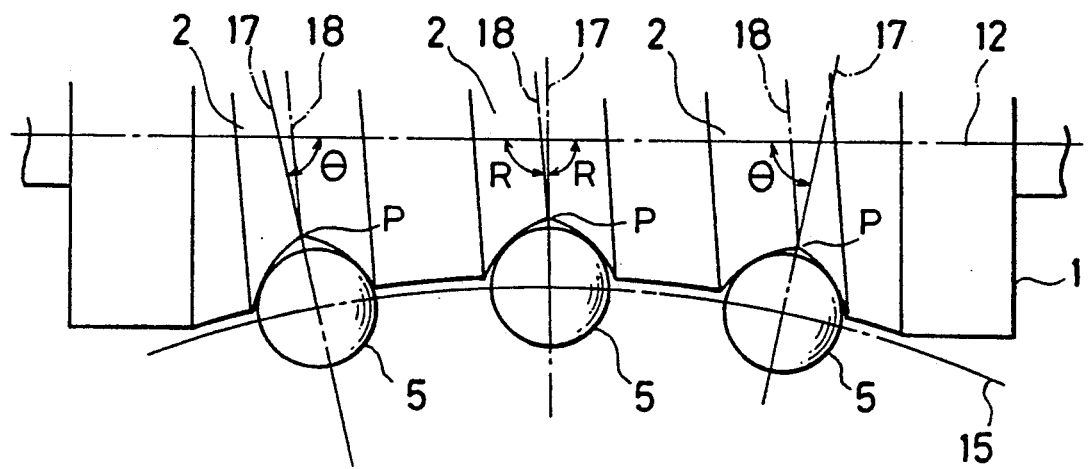
FIG. 15 is schematic view of the ball race of the conventional hourglass-shaped worm gear.

As shown in FIGS. 5 to 8, the ball guide 9 projects laterally in the tangential direction from the collar 4 and has a semicircular inside surface as viewed in section. The ball guide 9 is positioned to cover the corresponding ball port 6 such that as shown in FIG. 9, balls 5 (only one shown) can fit stably in the space defined by the semicircular inside surface of the ball guide 9 and the ball race 2, which is also semicircular in section. Moreover, as shown in FIG. 10, the edge 10 of the ball guide 9 does not come in contact with the balls 5 but is formed to have an angle such that an abutment surface 11 is defined at a position rearward of the edge 10.

The ball race 2 machined into the outer surface of the worm gear 1 is formed as a helical gothic groove into which the balls 5 can be loaded in a continuous row. As shown in FIGS. 1 and 11, this helical gothic groove is machined by defining straight lines lying normal (at angle R) to the axis 12 of the worm gear 1 as machining reference lines 13 and defining the machining position as the point of intersection P between the machining reference line 13 and the central reference axis 14 of the ball race 2.

The balls 5 inserted continuously into the ball race 2 formed to have the sectional configuration of a gothic groove in the aforesaid manner are covered by an outer guide 7 so as to be free to roll and travel and a wheel gear 8 having ball recesses 8' meshes with the worm gear 1 via the balls 5.

When the worm gear 1 of the rotation transmitter using balls of the foregoing structure is rotated, the rotation is transmitted to the wheel gear 8 meshed therewith via the balls 5. While this transmission of rotation is proceeding, the balls, which are present in the ball race 2 in a continuous row, rollingly travel along the ball race 2 to be successively and smoothly led into the ball circulation passage 3 through the ball port 6 at the terminal end of the ball race 2. The balls 5 then travel through the ball circulation passage 3 until being pushed out through the ball port 6 at the initial end of the ball race 2, whereafter they continue to circulate in the same manner. Since the ball race 2 is formed to have the sectional configuration of a gothic groove by using as the machining position the point of intersection P between the machining reference line 13 and the central reference axis 14, the central reference axis 14 falls at the center of the ball race 2 at all portions thereof. As a result, an excellent state of contact with the balls is ensured and skew is prevented so that the balls can roll and travel smoothly.

As will be understood from the foregoing description, the present invention thus provides an improvement in the ball circulation path in a rotation transmitter in which an hourglass-shaped worm gear and a wheel gear are meshed via balls which rollingly travel, one improvement being specifically that the ball guide of the collar fitted at the ball port where the ball race machined into the outer surface of the hourglass-shaped worm gear communicates with the ball circulation passage formed diagonally within the worm gear is constituted such that the edge of the guide holder, which is a critical location as regards smooth entry/exit of the balls, does not directly contact the balls, whereby wear, chipping, bending and friction are prevented. Moreover, since the inner surface of the ball guide which faces in the direction of contact is formed to have a semicircular configuration enabling it to cuppingly cover the balls and thus ensure their smooth passage in or out of the ball circulation passage, frictional resistance is markedly reduced, the danger of the balls clogging because of seizure is eliminated and noise is prevented. As a result, the efficiency of rotation transmission is improved and high-speed rotation is made possible.

Further, since the ball guide is formed as a projecting member it can be easily fabricated and also easily fitted with respect to the hourglass-shaped worm gear. There can thus be realized in improvement in machining precision and a reduction in production cost.

In addition, since the machining of the ball race is conducted at all portions of the worm gear using the point of intersection between the machining reference line and the central reference axis as the machining position, the result is a helical gothic groove which ensures uniform contact with the balls and, as a result, the rolling and traveling of the balls is stabilized, skew is prevented, frictional resistance is reduced, the efficiency of rotation transmission is increased and generation of noise is markedly reduced.

What is more, the fact that the machining and polishing of the ball race formed in the hourglass-shaped worm gear is conducted from a direction normal to the axis of the worm gear simplifies the groove preparation work and to provides improvements in both productivity and machining precision.

What is claimed is:

1. A ball circulation path in a rotation transmitter for transmitting rotation of an hourglass-shaped worm gear to a wheel gear meshed with the worm gear via balls which roll on the ball circulation path, comprising:
    a helical ball race formed on an outer surface of the worm gear;
    ball ports formed by removing portions of said ball race at opposite ends thereof;
    a ball circulation passage having openings at opposite ends thereof and extending diagonally through the interior of the worm gear at a position offset toward an outer surface of the worm gear from a central axis thereof so as to cause said openings to connect with said ball ports at an obtuse angle; and
    ball guides of semicircular sectional configuration provided detachably from said ball ports so as to project tangentially from axial sides of a pair of ring-shaped collars fitted face to face on opposite ends of the worm gear, said ball guides covering said ball ports and having distal ends thereof formed at an angle that prevents the distal ends from contacting the balls.

2. A ball circulation path according to claim 1, wherein said ball race is formed as a helical gothic groove by machining so as to be directed normal to the axis of the worm gear using as the machining position a point of intersection between a central reference axis of said ball race and a machining reference line laying normal to the central axis of the worm gear, with a pitch of said helical gothic groove made constant.

* * * * *